(12) United States Patent
Yasui et al.

(10) Patent No.: US 8,816,288 B2
(45) Date of Patent: Aug. 26, 2014

(54) RADIATION DETECTOR

(71) Applicant: HORIBA, Ltd., Kyoto (JP)

(72) Inventors: Kengo Yasui, Kyoto (JP); Yuji Okubo, Kyoto (JP)

(73) Assignee: HORIBA, Ltd. (JP)

( * ) Notice: Subject to any disclaimer, the term of this patent is extended or adjusted under 35 U.S.C. 154(b) by 0 days.

(21) Appl. No.: 13/946,454

(22) Filed: Jul. 19, 2013

(65) Prior Publication Data

US 2014/0021361 A1    Jan. 23, 2014

(30) Foreign Application Priority Data

Jul. 20, 2012    (JP) .................................. 2012-161753

(51) Int. Cl.
   *G01T 1/24*         (2006.01)
(52) U.S. Cl.
   USPC ..................................................... 250/370.01
(58) Field of Classification Search
   USPC ..................... 250/370.01–370.15; 378/98.8
   See application file for complete search history.

(56) References Cited

U.S. PATENT DOCUMENTS

| | | | | |
|---|---|---|---|---|
| 4,243,885 | A * | 1/1981 | Agouridis et al. | 250/370.07 |
| 4,379,232 | A * | 4/1983 | Hopper | 250/332 |
| 6,608,311 | B1 * | 8/2003 | Roziere et al. | 250/370.09 |
| 7,049,601 | B2 * | 5/2006 | Agano | 250/370.09 |
| 7,639,295 | B2 * | 12/2009 | Yuki et al. | 348/302 |
| 7,659,518 | B2 * | 2/2010 | Adachi | 250/370.09 |
| 8,115,178 | B2 * | 2/2012 | Marrs et al. | 250/370.11 |

FOREIGN PATENT DOCUMENTS

JP    3127930 B2    1/2001

* cited by examiner

*Primary Examiner* — Kiho Kim
(74) *Attorney, Agent, or Firm* — Cantor Colburn LLP

(57) ABSTRACT

In the radiation detector, a capacitor is connected between a connecting wire which is connected with a preamplifier (amplifier) and another connecting wire. Specifically, the capacitor is connected between the connecting wire and another connecting wire which has the lowest electric resistance with respect to a signal wire among connecting wires connected with a radiation detecting element. This prevents electric current produced by static electricity from flowing to the signal wire and prevents the signal wire or the preamplifier from being damaged by static electricity. A circuit element for a countermeasure against static electricity is not provided at the signal wire, and therefore input capacitance of the preamplifier is kept low. Accordingly, the radiation detector is improved by a sufficient countermeasure against static electricity while input capacitance of the preamplifier is kept low.

9 Claims, 7 Drawing Sheets

F I G. 4
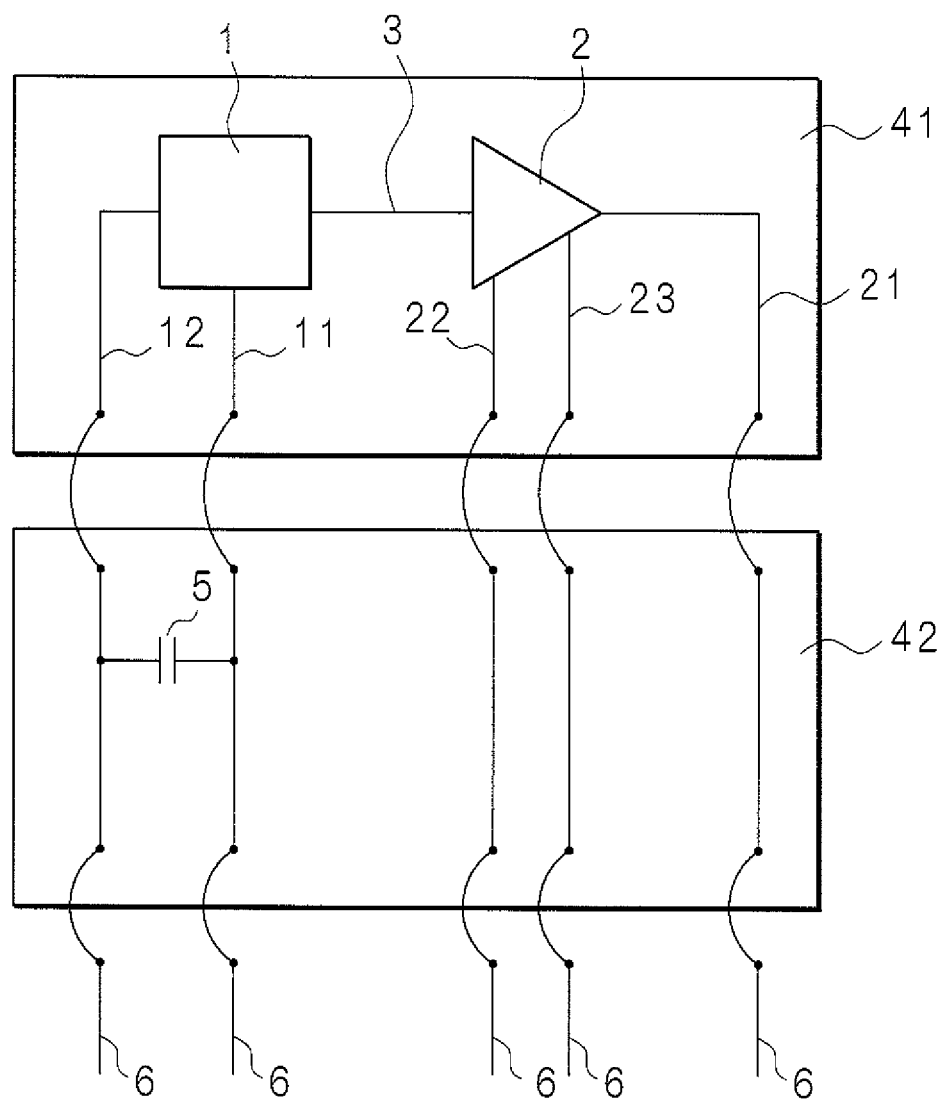

F I G. 6
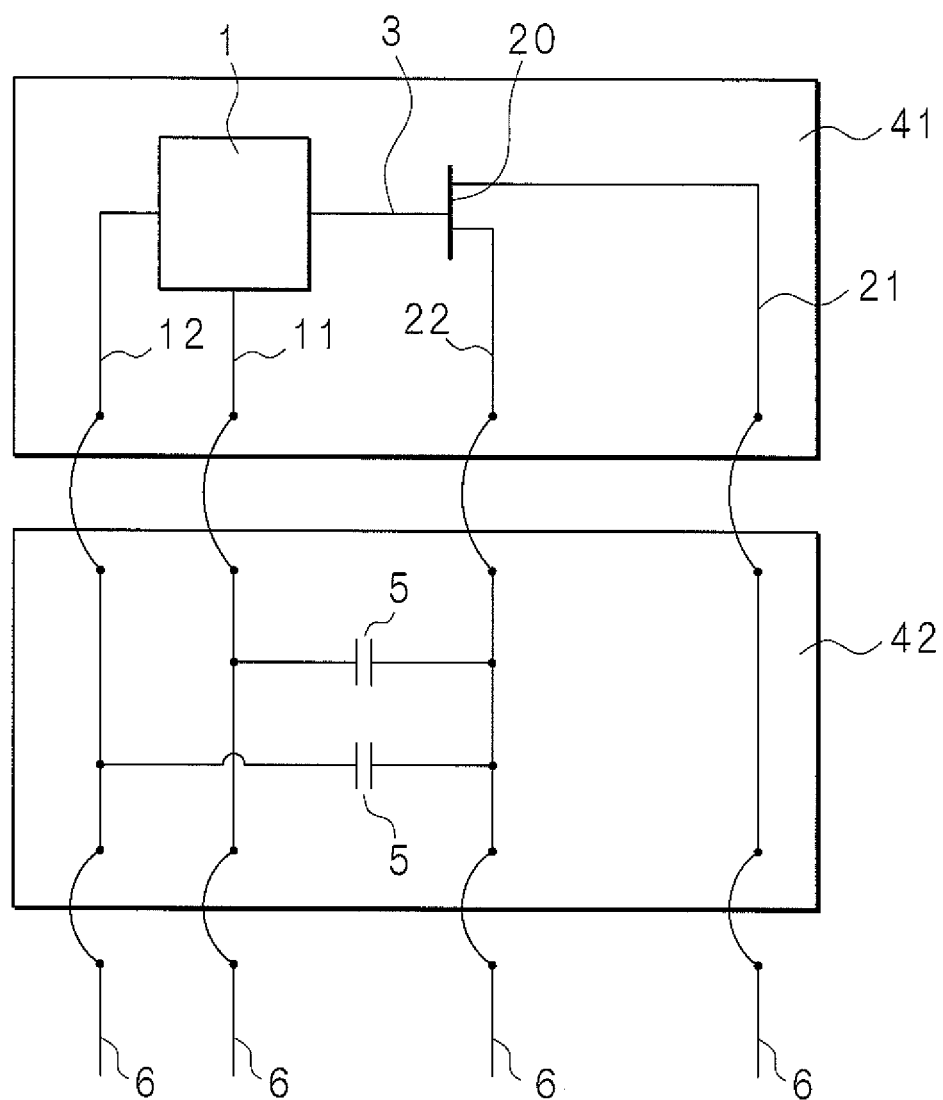

F I G. 7
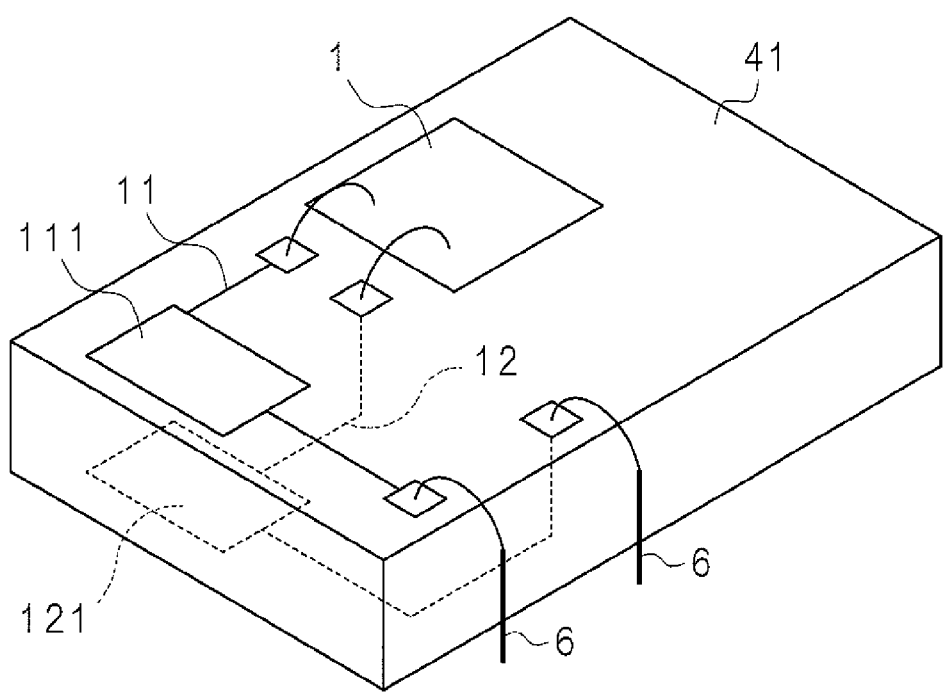

RADIATION DETECTOR

CROSS-REFERENCE TO RELATED APPLICATIONS

This Nonprovisional application claims priority under 35 U.S.C. §119(a) on Patent Application No. 2012-161753 filed in Japan on Jul. 20, 2012, the entire contents of which are hereby incorporated by reference.

BACKGROUND

1. Technical Field

The present invention relates to a radiation detector provided with a radiation detecting element and an amplifier, which is to be used as the whole or a part of a preamplifier.

2. Description of Related Art

A radiation detector for detecting radiation such as X-rays is provided with a radiation detecting element such as an SDD (Silicon Drift Detector). A radiation detecting element outputs a charge signal corresponding to detected radiation, the charge signal is converted into a voltage signal by a preamplifier, and signal processing such as creation of a spectrum is performed based on the voltage signal. Some conventional radiation detectors are formed as a unit including a radiation detecting element and a preamplifier. An example of a radiation detector formed as a unit is disclosed in Japanese Patent No. 3,127,930.

A radiation detector formed as a unit includes, in addition to a radiation detecting element and a preamplifier, connecting wires, which are respectively connected with each of the radiation detecting element and the preamplifier in order to supply electric power. Each connecting wire is connected with an external power supply or ground via a connecting terminal. Some other radiation detectors formed as a unit do not include the whole circuit of a preamplifier but include a part of a preamplifier. For example, in some radiation detectors, an FET (Field Effect Transistor), which is a part of a preamplifier, is connected with a radiation detecting element. In such a radiation detector, an FET is connected with the other part of the preamplifier, which exists in the exterior, via a connecting terminal.

SUMMARY OF THE INVENTION

Regarding a radiation detector, as input capacitance from a radiation detecting element to a preamplifier is increased, noise included in a signal to be outputted is increased and, as noise is increased, energy resolution of radiation detection deteriorates. In order to enhance the energy resolution of radiation detection, it is preferable to lower the input capacitance of a preamplifier. When a circuit element for a countermeasure against static electricity such as a capacitor is provided at a signal wire for inputting a signal from a radiation detecting element into a preamplifier, input capacitance of the preamplifier is increased. Therefore, as it stands, only an insufficient countermeasure against static electricity is implemented at a signal wire in order to suppress the input capacitance. Accordingly, handling of a conventional radiation detector has a problem that static electricity may damage a signal wire or a preamplifier by way of a connecting terminal and a connecting wire, causing breakdown of the radiation detector.

The present invention has been made in view of such problems, and the objective thereof is to provide a radiation detector improved by a sufficient countermeasure against static electricity while keeping input capacitance of a preamplifier low.

A radiation detector according to the present invention is characterized by comprising: a radiation detecting element for detecting radiation and outputting a signal; an amplifier, into which the signal from the radiation detecting element is inputted; a plurality of connecting wires, which are respectively connected with the radiation detecting element or the amplifier and are to be respectively connected with an external power supply or ground; and a circuit element, which is connected between at least one of the plurality of connecting wires and another connecting wire and has capacitance.

The radiation detector according to the present invention is characterized in that the circuit element is connected between each of one or a plurality of connecting wires which are connected with the radiation detecting element and one connecting wire which is connected with the amplifier and is to be connected with ground.

The radiation detector according to the present invention is characterized in that the amplifier is connected with a plurality of connecting wires, and the circuit element is connected between the one connecting wire and another connecting wire which is connected with the amplifier.

The radiation detector according to the present invention is characterized by further comprising a plurality of substrates, wherein the radiation detecting element and the amplifier are mounted on one of the plurality of substrates, and the circuit element is mounted on another substrate.

The radiation detector according to the present invention is characterized in that the circuit element has a characteristic not to conduct electric current in a predetermined direction on direct current voltage under a predetermined voltage value and to conduct electric current on pulsed voltage at a voltage value lower than the predetermined voltage value.

The radiation detector according to the present invention is characterized in that the circuit element is any one of a capacitor, a diode and a varistor.

The radiation detector according to the present invention is characterized in that the circuit element is a capacitor configured by using parasitic capacitance between one connecting wire and another connecting wire.

The radiation detector according to the present invention is characterized by further comprising a sealed housing, which has reduced internal pressure, wherein the sealed housing contains the radiation detecting element, the amplifier and the circuit element therein.

The radiation detector according to the present invention is characterized by further comprising a sealed housing, which contains inert gas enclosed therein, wherein the sealed housing contains the radiation detecting element, the amplifier and the circuit element therein.

In the present invention, regarding a radiation detector provided with a radiation detecting element and an amplifier, a circuit element having capacitance is connected between a plurality of connecting wires, which are respectively connected with the radiation detecting element or the amplifier and are to be respectively connected with the exterior. For example, a circuit element having capacitance such as a capacitor, a diode or a varistor is connected between connecting wires. For another example, a circuit element using parasitic capacitance between connecting wires is provided. A circuit element suppresses damage by static electricity through connecting wires.

Moreover, in the present invention, a circuit element having capacitance is connected between a connecting wire which is connected with the radiation detecting element and a connecting wire which is connected with the amplifier and is to be connected with external ground. Electric current produced by static electricity flows through the circuit element to ground.

Moreover, in the present invention, a circuit element having capacitance is connected between a connecting wire which is connected with the amplifier and is to be connected with external ground and another connecting wire which is connected with the amplifier. Electric current produced by static electricity generated at a connecting wire connected with the amplifier also flows through the circuit element to ground.

Moreover, in the present invention, a circuit element having capacitance is mounted on a substrate other than a substrate on which a radiation detecting element is mounted, so as to be provided at a position not to exert a negative impact on detection of radiation.

Moreover, in the present invention, a circuit element having capacitance has a characteristic not to conduct electric current in a predetermined direction on DC voltage under a predetermined voltage value and to conduct electric current on pulsed voltage at a voltage value lower than the predetermined voltage value. Therefore, such a circuit element does not operate in a state where DC voltage to be used for operation of a radiation detector is applied, and operates even at a low voltage when static electricity is generated, so as to protect a circuit.

Moreover, in the present invention, a radiation detector is constructed in such a manner that the radiation detecting element, the amplifier and the circuit element are located in a sealed housing.

With the present invention, a radiation detecting element is protected from static electricity while input capacitance of an amplifier to be used at least as a part of a preamplifier is kept low. Accordingly, the present invention produces beneficial effects such that a radiation detector is improved by a sufficient countermeasure against static electricity while input capacitance of a preamplifier is kept low.

The above and further objects and features of the invention will more fully be apparent from the following detailed description with accompanying drawings.

BRIEF DESCRIPTION OF THE SEVERAL VIEWS OF THE DRAWINGS

FIG. 4 is a schematic circuit diagram for illustrating an example of a radiation detector wherein the number of capacitors is decreased;

FIG. 6 is a schematic circuit diagram for illustrating an example of a radiation detector including a part of a preamplifier; and FIG. 7 is a schematic perspective view for illustrating an example of a radiation detector improved by a countermeasure against static electricity using parasitic capacitance.

DETAILED DESCRIPTION

The following description will explain the present invention in concrete terms with reference to the drawings illustrating an embodiment thereof.

Figure 1:
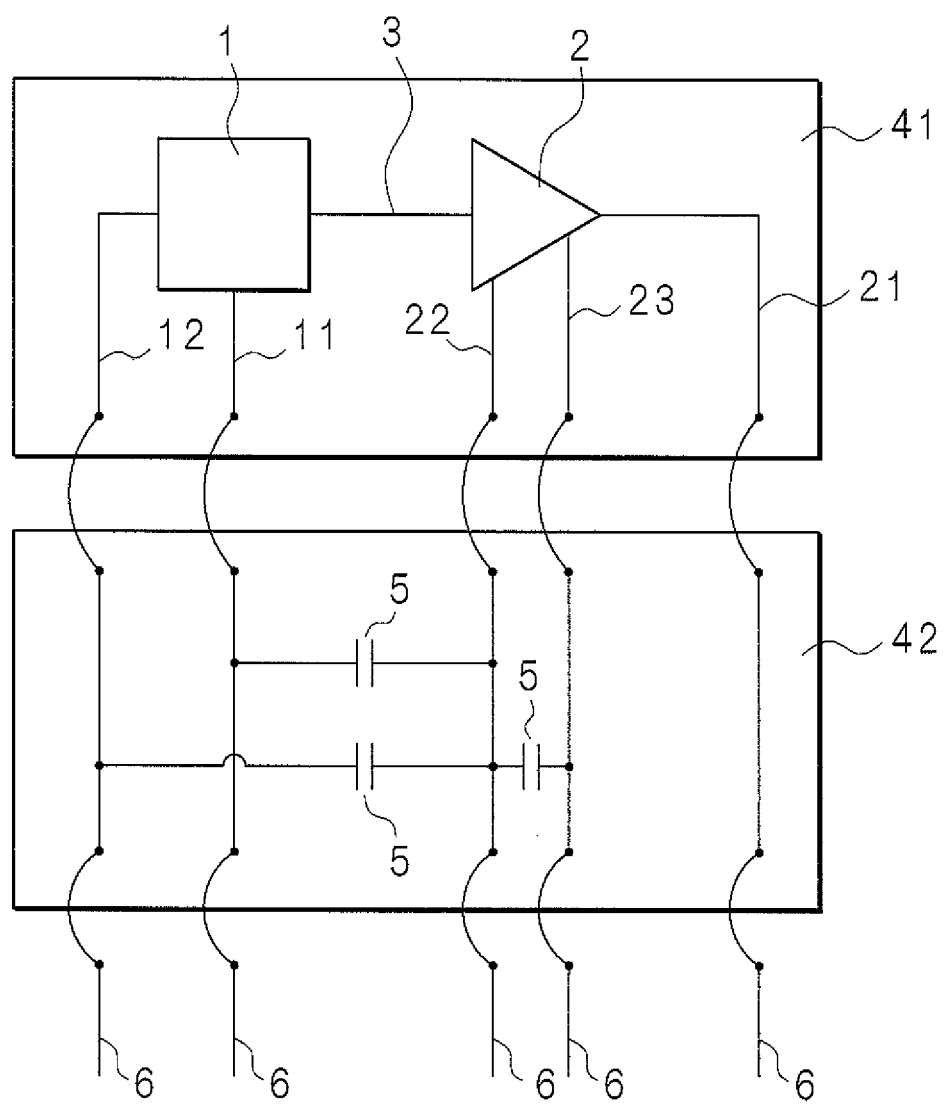
FIG. 1 is a schematic circuit diagram of a radiation detector of the present invention.

FIG. 1 is a schematic circuit diagram of a radiation detector of the present invention. A radiation detector is provided with a radiation detecting element 1 for detecting radiation such as X-rays. The radiation detecting element 1 is a semiconductor detecting element such as an SDD. When radiation enters the radiation detecting element 1, the radiation detecting element 1 generates a charge signal proportional to the energy of the radiation. An output terminal of the radiation detecting element 1 is connected with a signal wire 3. The radiation detecting element 1 outputs a charge signal and the outputted charge signal is transmitted through the signal wire 3. The radiation detector is further provided with a preamplifier 2, and an input terminal of the preamplifier 2 is connected with the signal wire 3. The preamplifier 2 is an amplifier according to the present invention and is constituted of, for example, an integrated circuit. A charge signal outputted from the radiation detecting element 1 passes through the signal wire 3 and is inputted into the preamplifier 2. The preamplifier 2 converts the inputted charge signal into a voltage signal proportional to the energy of the radiation. An output terminal of the preamplifier 2 is connected with an output line 21, which is connected with a connecting terminal 6 to be connected with the exterior. The preamplifier 2 outputs a voltage signal through the output line 21 and the connecting terminal 6 to the exterior. The radiation detecting element 1 and the preamplifier 2 are mounted on a substrate 41.

The radiation detecting element 1 is connected with connecting wires 11 and 12, in addition to the signal wire 3. Each of the connecting wires 11 and 12 is connected with a connecting terminal 6. Each of the connecting wires 11 and 12 is connected with an external power supply or ground through each connecting terminal 6. Voltage to be used for operation of the radiation detecting element 1 is applied from the exterior through the connecting wires 11 and 12 to the radiation detecting element 1. Electric resistance between the connecting wire 11 and the signal wire 3 is lower than electric resistance between another connecting wire which is connected with the radiation detecting element 1 and the signal wire 3. That is, the electric resistance in the radiation detecting element 1 at a path lying between the output terminal of the radiation detecting element 1, which is connected with the signal wire 3, and a connecting terminal which is connected with the connecting wire 11 is lower than that of another path. Although FIG. 1 illustrates a configuration wherein two connecting wires are connected with the radiation detecting element 1, a radiation detector may have a configuration wherein a single connecting wire is connected with the radiation detecting element 1 or a configuration wherein three or more connecting wires are connected.

The preamplifier 2 is connected with connecting wires 22 and 23, in addition to the signal wire 3 and the output line 21. Each of the connecting wires 22 and 23 is connected with a connecting terminal 6. The connecting wire 22 is a ground wire to be connected with external ground through a connecting terminal 6. The connecting wire 23 is connected with an external power supply through a connecting terminal 6. Although FIG. 1 illustrates a configuration wherein two connecting wires are connected with the preamplifier 2, a radiation detector may have a configuration wherein a single connecting wire is connected with the preamplifier 2 or a configuration wherein three or more connecting wires are connected. When three or more connecting wires are connected, each of the connecting wires is connected with an external power supply or ground.

Figure 2:
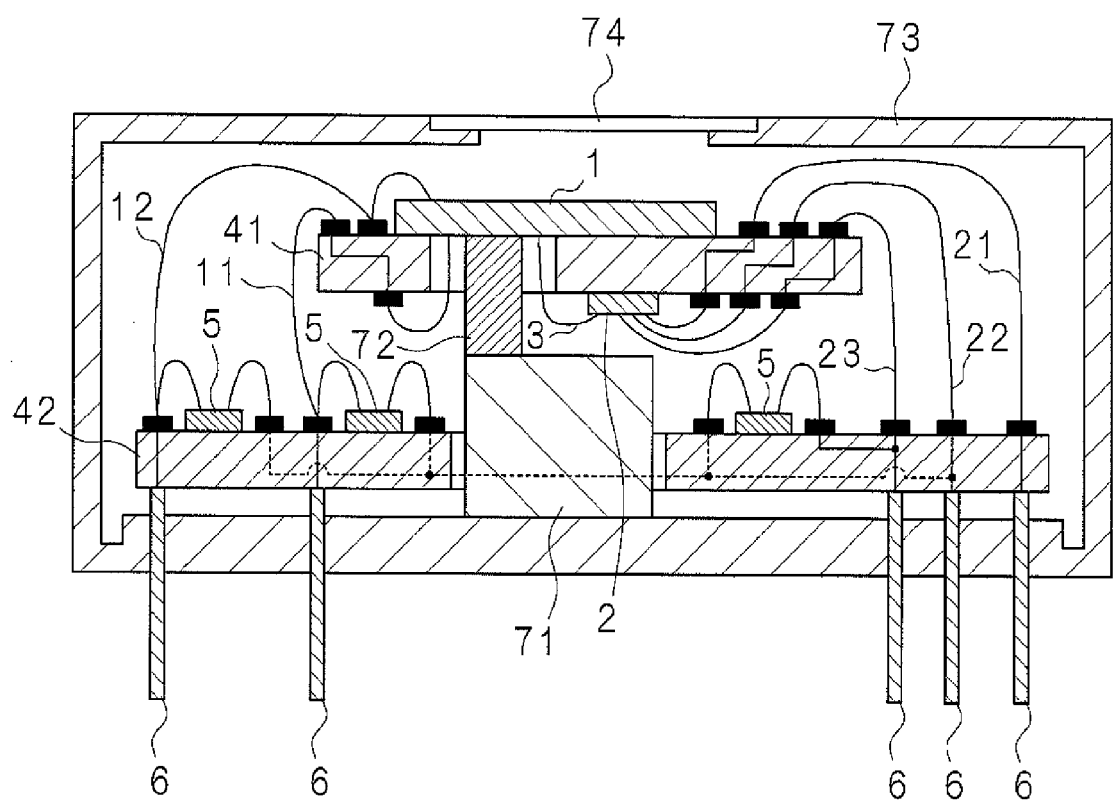
FIG. 2 is a schematic sectional view for illustrating an example of the structure of a radiation detector.

FIG. 2 is a schematic sectional view for illustrating an example of the structure of a radiation detector. The substrate 41, the radiation detecting element 1 and the preamplifier 2 are located in a sealed housing 73. A tip of each of the connecting terminals 6 projects to the exterior of the sealed housing 73. The sealed housing 73 has reduced internal pressure or contains inert gas filled and enclosed therein. The sealed housing 73 is sealed by a method such as adhesive bonding, soldering or brazing, so as to have a structure not to be opened easily. The sealed housing 73 is provided with a window part 74. The window part 74 is formed of a material which transmits radiation to be detected by the radiation detector, e.g., a carbon film such as diamond, a SiN film, a beryllium film or a polymer film. The window part 74 may be subjected to treatment of making the window part 74 opaque to visible light.

The radiation detecting element 1 is located on one face of the substrate 41 so as to be positioned in front of the window part 74. Radiation passes through the window part 74, enters the radiation detecting element 1, and is detected therein. The preamplifier 2 is located on the other face of the substrate 41 so as to be positioned behind the substrate 41 with respect to the radiation detecting element 1. The signal wire 3 is extended through a through hole provided at the substrate 41 and is connected with the radiation detecting element 1 and the preamplifier 2. Each of the connecting wires 11, 12, 22 and 23 and the output line 21 includes: wiring formed on the surface of or within the substrate 41; a bonding pad; and a wire.

In the sealed housing 73, a cooling unit 71 for cooling the radiation detecting element 1 is further provided. The cooling unit 71 is, for example, a Peltier device. The radiation detector is further provided with: a connecting unit, which is not illustrated in the figures, to be connected with an external power supply so as to supply electric power from the exterior to the cooling unit 71; and a heat radiation unit, which is not illustrated in the figures. The cooling unit 71 is coupled with a heat transfer unit 72, which is in contact with the radiation detecting element 1 and the substrate 41. The radiation detecting element 1 and the preamplifier 2 are cooled by the cooling unit 71 through the heat transfer unit 72 and the substrate 41. It is to be noted that the heat transfer unit 72 may be a part of the substrate 41. Cooling of the radiation detecting element 1 and the preamplifier 2 leads to reduction of noise.

For example, the radiation detector is provided in an X-ray detection apparatus. In the process, the output line 21 is connected with a signal processor in the X-ray detection apparatus via a connecting terminal 6. Moreover, the connecting wires 11 and 12 are connected with a power supply in the X-ray detection apparatus, the connecting wire 22 is connected with ground in the X-ray detection apparatus, and the connecting wire 23 is connected with a power supply. Electric power is supplied to the radiation detecting element 1 and the preamplifier 2, so that the radiation detecting element 1 and the preamplifier 2 operate. The radiation detector outputs a voltage signal from the output line 21, and the voltage signal is processed by the signal processor in the X-ray detection apparatus. The signal processor performs, for example, processing of counting voltage signals of each value and obtaining a spectrum of detected X-rays. For another example, the radiation detector is provided in an X-ray fluorescence analyser. In the X-ray fluorescence analyser, the radiation detector detects fluorescent X-rays from a sample and makes an X-ray fluorescence analysis of the sample. Moreover, the radiation detector may be a photodetector, for example.

As illustrated in FIGS. 1 and 2, the radiation detector is provided with a substrate 42 in addition to the substrate 41. The substrate 42 is located in the sealed housing 73 and, in the example illustrated in FIG. 2, is located parallel to the substrate 41, at a position to surround the cooling unit 71. A capacitor 5 is connected between the connecting wire 22 which functions as a ground wire and each of the other connecting wires, and the plurality of capacitors 5 are mounted on the substrate 42. That is, a capacitor 5 is connected between the connecting wire 22 and the connecting wire 11, another capacitor 5 is connected between the connecting wire 22 and the connecting wire 12, and yet another capacitor 5 is connected between the connecting wire 22 and the connecting wire 23. Each of the connecting wires 11, 12, 22 and 23 and the output line 21 includes: wiring formed on the surface of or within the substrate 42; and a bonding pad. Moreover, a part of a connecting wire for connecting a capacitor 5 between the connecting wire 22 and another connecting wire is constituted of wiring, which is drawn with broken lines in FIG. 2, formed inside the substrate 42. Since a capacitor 5 is connected between each connecting wire and the connecting wire 22, electric current produced by static electricity, which may be generated at any connecting terminal 6, flows through a capacitor 5 to ground and does not flow through a connecting wire to the signal wire 3. Therefore, neither the signal wire 3 nor the preamplifier 2 is damaged by static electricity, and the radiation detector is protected from static electricity. It is preferable that each capacitor 5 has sufficient capacitance for preventing electric current produced by static electricity from flowing through a connecting wire to the signal wire 3. For example, the capacitance of a capacitor 5 is preferably equal to or larger than 100 pF. When the capacitance of a capacitor 5 is 100 pF, it is possible to protect the radiation detector from static electricity of a voltage of 50V.

Regarding the radiation detector, the signal wire 3 or the preamplifier 2 suffers maximal damage when electric current produced by static electricity flows to the signal wire 3 through the connecting wire 11 which has the lowest electric resistance with respect to the signal wire 3 among the connecting wires connected with the radiation detecting element 1. Therefore, the radiation detector is most sensitive to static electricity through the connecting wire 11. In the present invention wherein a capacitor 5 is connected between the connecting wire 11 and the connecting wire 22, electric current produced by static electricity is prevented from flowing through the connecting wire 11 to the signal wire 3 and therefore damage to the signal wire 3 or the preamplifier 2 caused by static electricity is prevented effectively. Moreover, since a capacitor 5 is also connected between the connecting wire 22 and the connecting wire 23, electric current generated by static electricity at the connecting wire 23 flows through the capacitor 5 to ground. Electric current produced by static electricity is prevented from flowing from a connecting wire connected with the preamplifier 2 to the preamplifier 2 or the signal wire 3, and damage to the signal wire 3 or the preamplifier 2 caused by static electricity is prevented similarly.

Moreover, in the present embodiment wherein a circuit element for a countermeasure against static electricity is not provided at the signal wire 3, increase of input capacitance of the preamplifier 2 due to a circuit element is prevented, and input capacitance of the preamplifier 2 is kept low. Accordingly, regarding a radiation detector of the present invention, a sufficient countermeasure against static electricity is implemented while input capacitance of the preamplifier is kept low. Therefore, the radiation detector can achieve radiation detection with high energy resolution and has excellent resistance to static electricity.

Moreover, in the present embodiment, a plurality of capacitors 5 are mounted on the substrate 42 other than the substrate 41 on which the radiation detecting element 1 and the preamplifier 2 are mounted. It is preferable that a capacitor 5 is provided at a position not to exert a negative impact on detection of radiation. For example, a capacitor 5 is provided at a position not to receive radiation, or a position not to allow radiation generated by radiation to the capacitor 5 to enter the radiation detecting element 1. In the example illustrated in FIG. 2, the substrate 41 and the radiation detecting element 1 are located between the window part 74 and the substrate 42, so that radiation which have passed through the window part 74 mostly enter the radiation detecting element 1 and rarely enter the capacitors 5. Since a plurality of capacitors 5 are mounted on the substrate 42 other than the substrate 41, the location of the capacitors 5 can be adjusted easily to positions not to exert a negative impact on detection of radiation. Moreover, since location of the capacitors 5 can be adjusted without changing the location of the radiation detecting element 1 and the preamplifier 2, it becomes easier to construct a radiation detector of the present invention using a circuit layout of an existing radiation detector.

Figure 3:
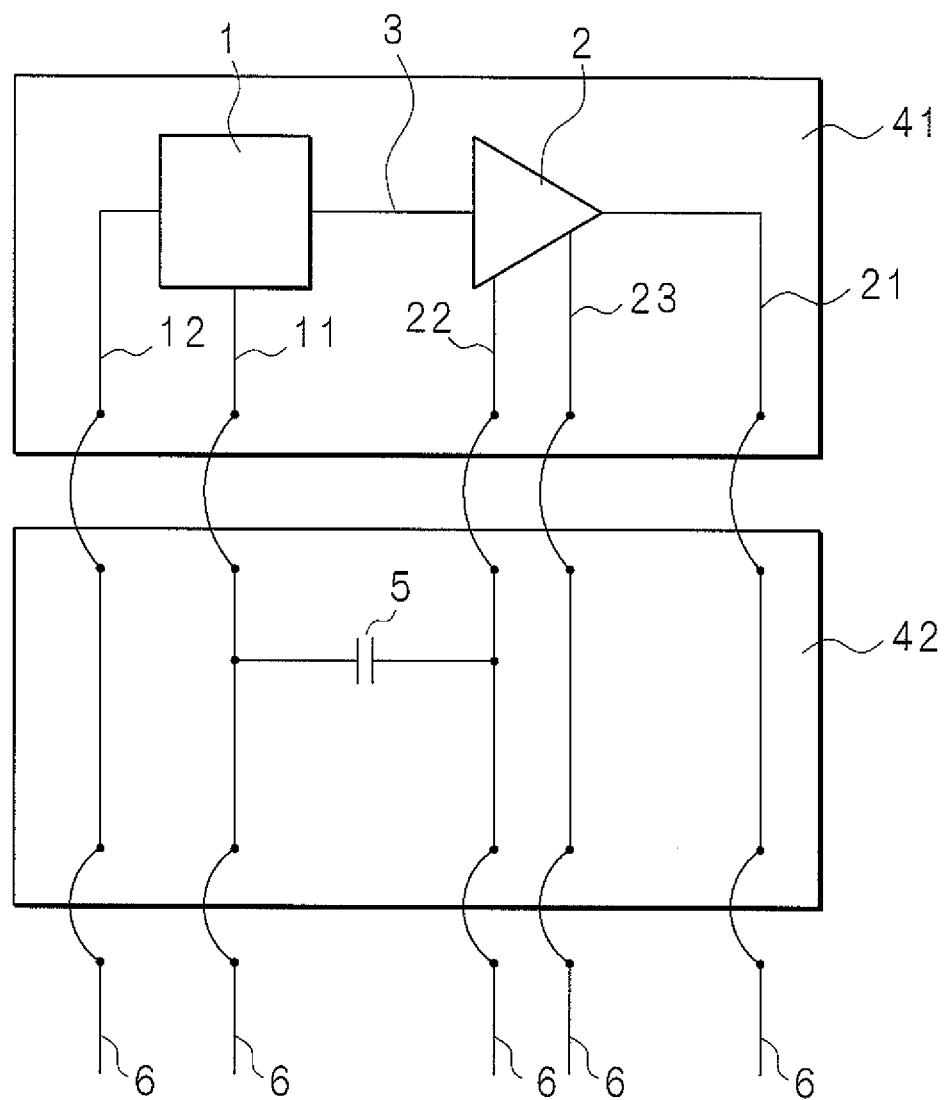
FIG. 3 is a schematic circuit diagram for illustrating an example of a radiation detector wherein the number of capacitors is decreased.

Next, another example of the structure of a radiation detector will be described. FIGS. 3 and 4 are schematic circuit diagrams for illustrating examples of a radiation detector wherein the number of capacitors 5 is decreased. In the example illustrated in FIG. 3, a capacitor 5 is connected between the connecting wire 11 and the connecting wire 22 and no other capacitor 5 is provided. In such an example, flow of electric current produced by static electricity through the connecting wire 11 to the signal wire 3 is also prevented by the capacitor 5. In such an example, a part which is most sensitive to static electricity of the radiation detector is protected by the capacitor 5 in a focused manner, and a small number of capacitors 5 implement a maximal countermeasure against static electricity. As illustrated in FIG. 3, a radiation detector may have a configuration wherein a capacitor 5 is connected between the connecting wire 11 which has the lowest electric resistance with respect to the signal wire 3 among connecting wires connected with the radiation detecting element 1 and another connecting wire and the other capacitors 5 are omitted.

In the example illustrated in FIG. 4, a capacitor 5 is connected between the connecting wire 11 and the connecting wire 12 and no other capacitor 5 is provided. In such an example, flow of electric current produced by static electricity through the connecting wire 11 to the signal wire 3 is also suppressed by the capacitor 5. As illustrated in FIG. 4, a radiation detector may have a configuration wherein a capacitor 5 is connected between a connecting wire other than the connecting wire 22 and the connecting wire 11. Moreover, a radiation detector may have a configuration wherein a capacitor 5 is connected between the connecting wire 11 and each of a plurality of other connecting wires. When a capacitor 5 is connected between the connecting wire 11 and another connecting wire, a part which is most sensitive to static electricity is protected in a focused manner and a radiation detector has resistance to static electricity. Moreover, a radiation detector may have a configuration wherein a capacitor 5 is connected between connecting wires other than the connecting wire 11. In such a configuration, flow of electric current produced by static electricity through a connecting wire connected with the capacitor 5 to the signal wire 3 is also suppressed.

Figure 5:
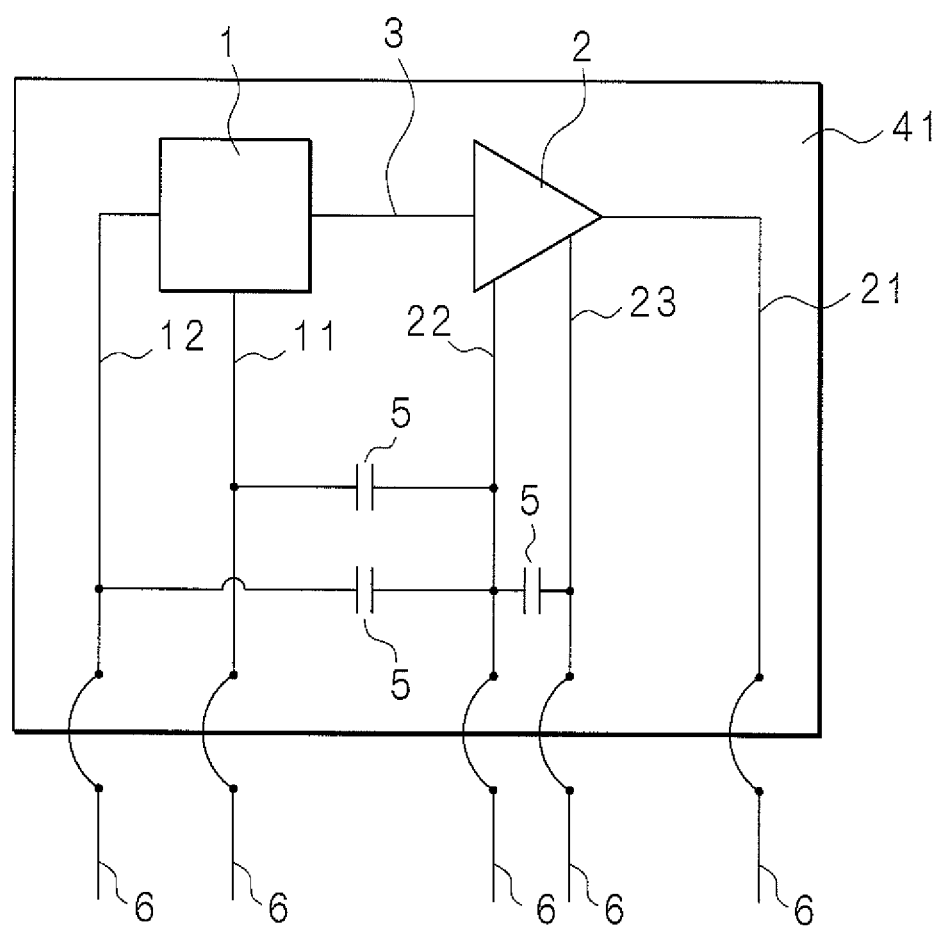
FIG. 5 is a schematic circuit diagram for illustrating an example of a radiation detector wherein one substrate is provided.

FIG. 5 is a schematic circuit diagram for illustrating an example of a radiation detector wherein one substrate is provided. As illustrated in FIG. 5, a radiation detector may have a configuration wherein capacitors 5 for a countermeasure against static electricity are mounted on the substrate 41 on which the radiation detecting element 1 and the preamplifier 2 are mounted. A radiation detector may also have a configuration wherein a capacitor 5 is not mounted on a substrate but provided directly at a connecting wire. A radiation detector may also have a configuration wherein a capacitor 5 is connected between connecting terminals 6 connected with respective connecting wires.

A radiation detector may also have a configuration wherein an amplifier to be used as a part of a preamplifier is provided. FIG. 6 is a schematic circuit diagram for illustrating an example of a radiation detector including a part of a preamplifier. In the example illustrated in FIG. 6, the radiation detector is provided with an FET 20, which corresponds to an amplifier. The FET 20 is connected with the signal wire 3 and is further connected with the output line 21 and the connecting wire 22. The connecting wire 22 is a ground wire. The output line 21 is connected with the other part of the preamplifier, which is provided at the exterior, via a connecting terminal 6. For example, the radiation detector is provided in an X-ray detection apparatus provided with the other part of the preamplifier. When a signal from the radiation detecting element 1 is inputted through the signal wire 3 into the FET 20, the FET 20 amplifies the signal arbitrarily and outputs a signal through the output line 21 to the other part of the preamplifier. Moreover, a capacitor 5 is connected between the connecting wire 11 and the connecting wire 22, and another capacitor 5 is connected between the connecting wire 12 and the connecting wire 22. With such a configuration, a radiation detector is also protected from static electricity by the capacitors 5.

It is to be noted that a radiation detector may have a configuration wherein a circuit element other than a capacitor is used as a circuit element for a countermeasure against static electricity, as long as the circuit element has capacitance. For example, a radiation detector may use a diode or a varistor as a circuit element for a countermeasure against static electricity. Since the radiation detecting element 1 is a semiconductor detecting element, constant DC voltage is applied to the radiation detecting element 1 in operation. Therefore, it is preferable that a circuit element for a countermeasure against static electricity is constructed not to be operated by voltage applied to the radiation detecting element 1 in operation. On the other hand, in order to effectively prevent the signal wire 3 or the preamplifier 2 from being damaged by electric current produced by static electricity, a circuit element for a countermeasure against static electricity is preferably operated even by a low voltage when static electricity is generated. Accordingly, a circuit element for a countermeasure against static electricity such as a diode or a varistor preferably has a characteristic not to conduct electric current on DC voltage under a predetermined voltage value and to conduct electric current on pulsed voltage at a voltage value lower than the predetermined voltage value. Moreover, it is preferable that a circuit element such as a diode or a varistor has sufficient capacitance for preventing electric current produced by static electricity from flowing through a connecting wire to the signal wire 3.

Moreover, a radiation detector may have a configuration wherein a plurality of circuit elements are used at one place to implement a countermeasure against static electricity. For example, a radiation detector may have a configuration wherein a plurality of capacitors 5 are connected between the connecting wire 11 and the connecting wire 22. For another example, a radiation detector may have a configuration wherein a circuit for a countermeasure against static electricity composed of a plurality of types of circuit elements including a capacitor are provided between the connecting wire 11 and the connecting wire 22. It is preferable that capacitance obtained by combination of a plurality of circuit elements provided at one place is sufficient for preventing electric current produced by static electricity from flowing through a connecting wire to the signal wire 3.

Moreover, a radiation detector is not limited to a configuration wherein a discrete circuit element is used for implementing a countermeasure against static electricity but may have a configuration wherein a circuit element using parasitic capacitance as capacitance for a countermeasure against static electricity is provided. FIG. 7 is a schematic perspective view for illustrating an example of a radiation detector improved by a countermeasure against static electricity using parasitic capacitance. A part of a radiation detector is illustrated in FIG. 7. The radiation detecting element 1 is mounted on the insulating substrate 41, and the connecting wire 11 is formed of conductive wiring. The connecting wire 11 is connected with the radiation detecting element 1 and a connecting terminal 6 via a bonding pad and a wire. The substrate 41 is a multilayer substrate, and a conductive wiring layer is provided therein. The connecting wire 12 is formed of the wiring layer in the substrate 41. The connecting wire 12 is drawn with broken lines in FIG. 7. The connecting wire 12 is connected by a via with a bonding pad provided on the substrate 41, and is connected with the radiation detecting element 1 and a connecting terminal 6 via the bonding pad and a wire. It is to be noted that the connecting wire 12 may be formed on a reverse face of the substrate 41.

In the middle of the connecting wire 11, a rectangular plate part 111 is provided. The plate part 111 is a metal plate having a certain area. Moreover, in the middle of the connecting wire 12, a rectangular plate part 121 is provided. The plate part 121 is a metal plate having an area equivalent to that of the plate part 111. Moreover, the plate part 121 is provided immediately below the plate part 111, that is, at a position to overlap the plate part 111 when projected vertically onto the top face of the substrate 41. The plate part 111 and the plate part 121 are substantially parallel to each other. It is to be noted that the plate part 111 and the plate part 121 may have shapes other than a rectangle.

Since a part of the insulating substrate 41 exists between the conductive plate part 111 and the conductive plate part 121, parasitic capacitance is generated between the plate part 111 and the plate part 121. Such a state is similar to a state where a capacitor having a pair of electrodes constituted of the plate part 111 and the plate part 121 and dielectrics constituted of a part of the substrate 41 is connected between the connecting wire 11 and the connecting wire 12. That is, a circuit of a radiation detector illustrated in FIG. 7 is equivalent to a circuit wherein a capacitor 5 is connected between the connecting wire 11 and the connecting wire 12 as illustrated in FIG. 4. In such a configuration, the radiation detector is also protected from static electricity as is the case with the example illustrated in FIG. 4. The plate part 111 and the plate part 121 have sizes to provide sufficient capacitance for preventing electric current produced by static electricity from flowing through a connecting wire to the signal wire 3.

A capacitor having a pair of electrodes composed of the plate part 111 and the plate part 121 is a circuit element, which is connected between the connecting wire 11 and the connecting wire 12 and has capacitance. As described above, a circuit element, which is connected between connecting wires, for a countermeasure against static electricity is not limited to a discreet circuit element but may be a circuit element including a part of a connecting wire using parasitic capacitance between connecting wires as capacitance. Similarly, a circuit element using parasitic capacitance may be used for implementing a countermeasure against static electricity other than the example illustrated in FIG. 7. For example, a countermeasure against static electricity may be implemented by providing a circuit element using parasitic capacitance between the connecting wire 11 and the connecting wire 22. Moreover, a radiation detector may have a configuration wherein a countermeasure against static electricity is implemented by combination of a circuit element using parasitic capacitance and a discrete circuit element.

It is to be noted that a minimum structure of a radiation detector is illustrated in FIGS. 1 to 7, and a radiation detector may have a configuration, which includes another circuit element or wiring that is not illustrated in the figures for use other than a countermeasure against static electricity.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A radiation detector comprising:
   a radiation detecting element for detecting radiation and outputting a signal;
   an amplifier, into which the signal from the radiation detecting element is inputted;
   a plurality of connecting wires, which are respectively connected with the radiation detecting element or the amplifier and are to be respectively connected with an external power supply or ground; and
   a circuit element, which is connected between at least one of the plurality of connecting wires and another connecting wire and has capacitance.

2. The radiation detector according to claim 1,
   wherein the circuit element is connected between each of one or a plurality of connecting wires which are connected with the radiation detecting element and one connecting wire which is connected with the amplifier and which is to be connected with ground.

3. The radiation detector according to claim 2,
   wherein the amplifier is connected with a plurality of connecting wires, and
   the circuit element is connected between the one connecting wire and another connecting wire which is connected with the amplifier.

4. The radiation detector according to claim 1, further comprising
   a plurality of substrates,
   wherein the radiation detecting element and the amplifier are mounted on one of the plurality of substrates, and
   the circuit element is mounted on another substrate.

5. The radiation detector according to claim 1,
   wherein the circuit element has a characteristic not to conduct electric current in a predetermined direction on direct current voltage under a predetermined voltage value and to conduct electric current on pulsed voltage at a voltage value lower than the predetermined voltage value.

6. The radiation detector according to claim 1,
   wherein the circuit element is any one of a capacitor, a diode and a varistor.

7. The radiation detector according to claim 1,
   wherein the circuit element is a capacitor configured by using parasitic capacitance between one connecting wire and another connecting wire.

8. The radiation detector according to claim 1, further comprising
- a sealed housing, which has reduced internal pressure,
- wherein the sealed housing contains the radiation detecting element, the amplifier and the circuit element therein.

9. The radiation detector according to claim 1, further comprising
- a sealed housing, which contains inert gas enclosed therein,
- wherein the sealed housing contains the radiation detecting element, the amplifier and the circuit element therein.

* * * * *